United States Patent [19]

Pursley

[11] 3,854,886

[45] Dec. 17, 1974

[54] APPARATUS FOR PREPARING CHLORINE PENTAFLUORIDE

[75] Inventor: John A. Pursley, Northridge, Calif.

[73] Assignee: Rockwell International Corporation, El Segundo, Calif.

[22] Filed: Nov. 30, 1967

[21] Appl. No.: 705,871

Related U.S. Application Data

[62] Division of Ser. No. 374,886, June 9, 1964.

[52] U.S. Cl. .................... 23/260, 149/1, 423/466

[51] Int. Cl. .................... B01b 5/00

[58] Field of Search ............ 23/262, 263, 284, 205, 23/215, 218, 326, 351, 352, 353, 260

[56] References Cited

UNITED STATES PATENTS

| | | | |
|---|---|---|---|
| 1,425,500 | 8/1922 | Matheson et al. | 23/263 |
| 2,235,561 | 3/1941 | Wadeau et al. | 23/263 |
| 2,376,748 | 5/1945 | Atwood | 23/262 |
| 2,894,811 | 7/1959 | Rosen | 23/352 |
| 3,109,866 | 11/1963 | Sallen et al. | 23/205 |

*Primary Examiner*—Leland A. Sebastian
*Attorney, Agent, or Firm*—Robert M. Sperry

[57] ABSTRACT

Apparatus for producing a compound from two reactants comprising a reaction chamber, a condensing chamber, means for maintaining temperatures in each of said chambers to effect reaction between the reactants and to effect condensation of a formed compound in each of said chambers, respectively, a means for recirculating uncondensed gases from the condensing chamber, such means comprising means providing a temperature and density differential of such gases between said chambers sufficient to be the driving force to recirculate the uncondensed gases. The apparatus is particularly useful for the production of chlorine pentafluoride by reaction of fluorine with one of the group of chlorine, chlorine monofluoride and chlorine trifluoride.

8 Claims, 1 Drawing Figure

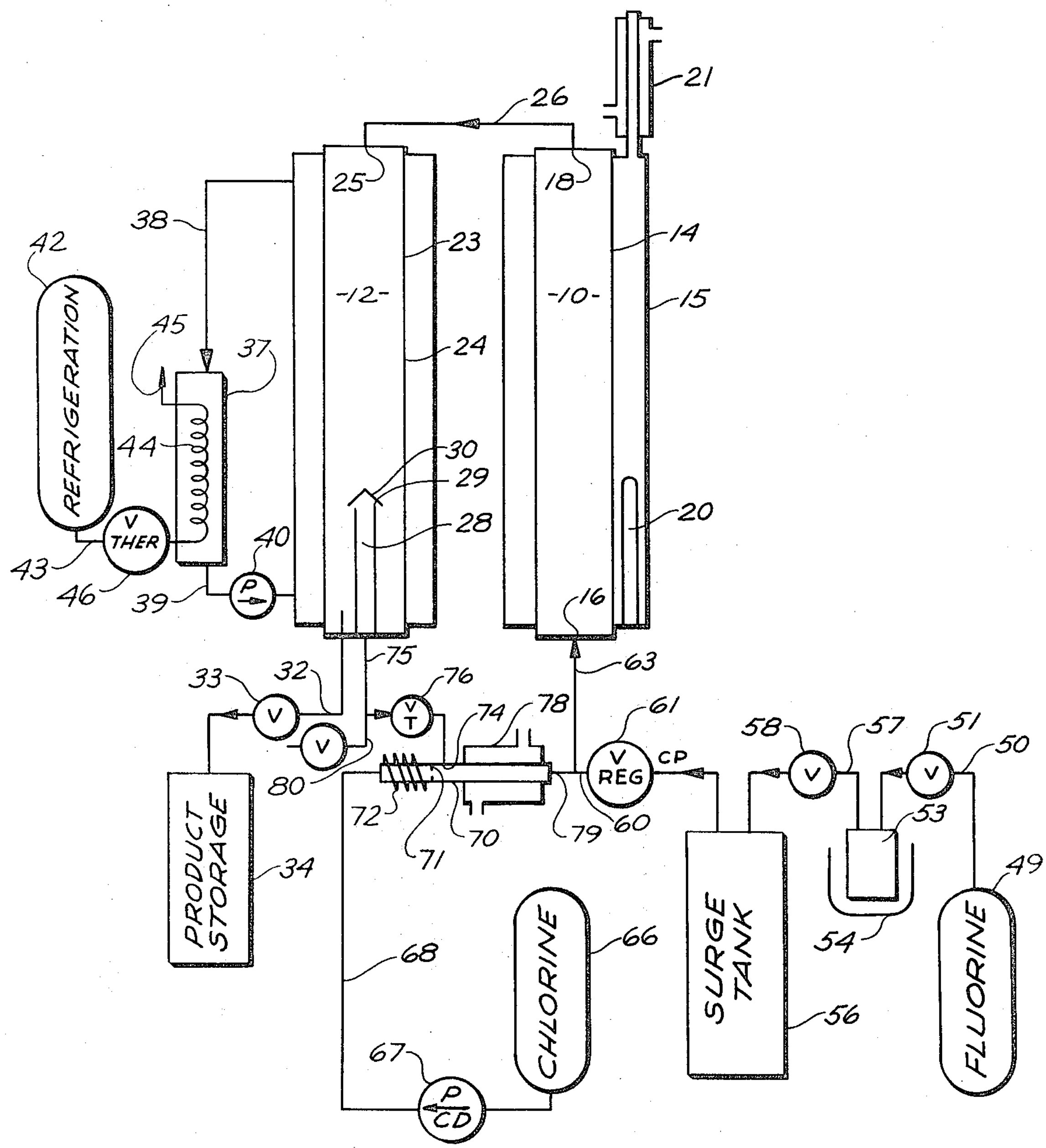
INVENTOR.
JOHN A. PURSLEY
BY Thomas S. Macdonald
ATTORNEY

APPARATUS FOR PREPARING CHLORINE PENTAFLUORIDE

This is a division of application Ser. No. 374,886, filed June 9, 1964.

This invention relates to process and apparatus of industrial plant size for production of chlorine pentafluoride ($ClF_5$) by reaction of fluorine with at least one member of the group consisting of chlorine, chlorine monofluoride($ClF$) and chlorine trifluoride ($ClF_3$).

This invention is an improvement on that invention which is disclosed in patent application, Ser. No. 313,410, filed Sept. 30, 1963, now U.S. Pat. No. 3,756,780, by Donald Pilipovich et al., for the synthesis of chlorine pentafluoride. As mentioned in that patent application, chlorine pentafluoride is an extremely high energy oxidizer of greater oxidizing potential than chlorine trifluoride which finds utility as an oxidizer for rocket propellant fuels. The boiling point of chlorine pentafluoride is about −14°C.

The fluorine and the chlorine-fluorides for the chemical reactions of this invention are highly reactive with all organic compounds and with many inorganic compounds including glass and water with which they are violently reactive. Stainless steel is resistant to reaction with the fluorine and chlorine-fluoride chemicals involved in the process of this invention; however, items of plant equipment having moving parts and employing lubricants and elastomer seals are objectionable.

It is a general object of this invention to provide process and apparatus for continuous type production of chlorine pentafluoride, operable at high pressures without mechanical compression.

The apparatus of this invention includes a reaction chamber and a condensing chamber, the chambers being inter-connected at their upper ends for flow of gas from the reaction chamber to the condensing chamber with the pressures in the chambers being substantially the same. Fluorine as one reactant and chlorine and (or) chlorine fluoride as another reactant are continuously passed into the lower end of the reaction chamber. The temperature and pressure in the reaction chamber are maintained sufficiently high to effect formation of chlorine pentafluoride as a gas. The gaseous mixture in the reaction chamber, which comprises fluorine and chlorine pentafluoride, passes to the condensing chamber. The temperatures in the condensing chamber is maintained sufficiently low to effect condensation of the chlorine pentafluoride from the mixture. The condensed chlorine pentafluoride settles to the bottom of the condensing chamber from where it is withdrawn. The uncondensed gas (primarily fluorine) is continuously recycled from the condensing chamber to the lower end of the reaction chamber. There is no significant pressure drop from one chamber to the other.

The motion of gases in the cyclical system of this invention, i.e., upward in the reaction chamber and downward in the condensing chamber, occurs through convection as a result of the differences of density of the gases in the respective chambers and the action of gravity. In the process of this invention, such convection is thermally produced. For the gases to ascend in the reaction chamber and descent in the condensing chamber, the static head of gas in the reaction chamber is less than that of the gas in the condensing chamber. In the case where the chambers are of the same height, to induce convection it is needed only that the average density in the reaction chamber exceed that in the condensing chamber. This is accomplished in the system of this invention by maintaining the temperature in the condensing chamber low enough to condense the fluorides and by maintaining the temperature in the reaction chamber high enough to effect reaction.

The chemical reactions involved in this invention are represented by the following equations:

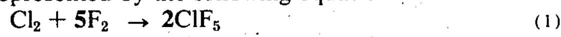

$$Cl_2 + 5F_2 \rightarrow 2ClF_5 \quad (1)$$

$$ClF + 2F_2 \rightarrow ClF_5 \quad (2)$$

$$ClF_3 + F_2 \rightarrow ClF_5 \quad (3)$$

As is explained in the aforementioned patent application, Ser. No. 313,410, an increase in pressure will cause an increase in yield of chlorine pentafluoride for each of the above equations, whereby pressures of 20,000 psi, for example, would result in a more facile production of chlorine pentafluoride than 1,000 psi, for example. From an economical standpoint, it is desirable to employ conventional equipment rather than special heavy duty equipment. Balancing the factor of cost of equipment for a small plant against increase in yield due to increase in pressures, equipment designed to handle reactions occurring up to about 2,000 psi provides satisfactory results. A practical minimum for plant production is a pressure of about 500 psi.

As is set forth in the aforesaid patent application, complete fluorination of chlorine and (or) chlorine-fluorides to form chlorine pentafluoride is accomplished by heating the fluorine and the chlorine-containing reactant to a temperature of from about 100° to 400°C (preferably from 100° to 280°C) and by compressing the reactants to at least about 100 psi, preferably to at least 330 psi. At temperatures significantly above about 400°C severe corrosion of the reaction vessels, (e.g., stainless steel, Monel metal) occurs and the passive fluoride films on the reaction vessels and flow lines either decompose or volatilize to present "fresh" metal for corrosion.

The yield of the pentafluoride, based on the chlorine or chlorine-containing reactants is increased by using an excess of fluorine. When the reactants are fluorine and chlorine, the mono, tri, and penta fluorides are formed; when the reactants are fluorine and the monofluoride, the tri and the penta fluorides are formed, and when the reactants are fluorine and the tri-fluoride, the pentafluoride is formed. The use of about twice the stoichiometric quantity of fluorine for full fluorination to the pentafluoride provides improved yields; but if the excess of fluorine be substantially increased then the reaction time decreases because of increased volume and consequent flow rate through the reactor, wherefore the yield decreases.

Inert gases, e.g., nitrogen and helium, do not affect the qualitative aspects of the reactions of this invention; however, inasmuch as the process of this invention is cyclical and continuous, inert gases should be avoided, otherwise they would accumulate in the system and thereby substantially decrease the concentrations of the reactants. Purging of such noncondensible inerts may be effected through a vent at 80 in line 75.

Impurity traces of water or other oxygen containing compounds in the reactants cause formation of $FClO_2$, $ClO_2$, $FClO_3$ as contaminants. Impurities of organic compounds result in fluorinated carbon compounds which would require periodic removal from the system.

The invention is hereinafter illustrated by description with reference to the accompanying drawing, the single FIGURE of which is a schematic representation of a pilot plant for continuous cyclical flow operations involving chemical reactions of fluorine and chlorine to produce chlorine pentafluoride.

In the drawing, reference numerals 10 and 12 designate a reaction chamber and a condensing chamber, respectively, arranged side by side. The reaction chamber 10 is defined by a tall cylinder 14 encircled by a full-length jacket 15. Adjacent its lower end, the cylinder 10 has an inlet 16 for admitting the reactants, gaseous fluorine and gaseous chlorine, and for admitting recycled uncondensed gas from the condensing chamber. Adjacent its upper end, cylinder 10 has an outlet 18 for flow of the product mixture from the reaction chamber, the mixture usually consisting essentially of fluorine, chlorine trifluoride and chlorine pentafluoride.

The jacket 15 serves to maintain the temperature in the reaction chamber sufficiently high, correlative to the pressure in the chamber, to effect reaction between the chlorine and the fluroine to form chlorine pentafluoride. The chemical reactions which occur in the reaction chamber are exothermic. For a reaction chamber of relatively large size the jacket 15 is designed to remove heat from the chamber. For the illustrated pilot plant the jacket 15 is designed to permit operation at various temperatures. More particularly, the jacket 15 contains a heat-transfer fluid, e.g., Dowtherm. An immersion heater 20 is positioned in the lower end portion of the jacket, and a water-cooled reflux condenser 21 is connected to the upper end of the jacket 15 casing. For maintaining a predetermined temperature, the jacket is pressurized with an inert gas, e.g., nitrogen, to develop a pressure in the jacket at which the boiling point of the heat-transfer fluid will be about equal to the temperature at which it is desired that the reaction chamber be maintained. If for the case of a small plant having a reaction chamber of relatively large radiating surface area per unit volume, it may be necessary to continually add heat through energizing the heater 20. The condenser 21 serves to counteract the effect of too high a rate of heat addition by refluxing the vapor of the heat-transfer fluid.

The condensing chamber 12 is defined by a tall cylinder 23 encircled by a full-length jacket 24. The cylinder 23 has an inlet 25 adjacent its upper-end. A flow line 26 connects the inlet 25 to the outlet 18 of the reaction chamber and thereby effects transfer of the gaseous product mixture from the reaction chamber to the condensing chamber. The jacket 24 serves to maintain the temperature in the condensing chamber sufficiently low, correlative to the pressure in the chamber, to condense the fluorides from the gaseous product mixture. The uncondensed gas (primarily fluorine) is withdrawn from the condensing chamber by way of tube 28. Such fluorine outlet tube 28 has an open end 29 remote from the upper end of the condensing chamber and the tube extends upwardly from the lower end wall of the cylinder 23. A baffle 30 is spaced slightly above the opening 29 of the fluorine outlet tube 28 to deflect condensate from entering the tube. The condensed fluorides pass from the condensing chamber via flow line 32 having a valve 33 and leading to a storage tank 34 from where the fluorides may be passed to a fractionation system (not shown) for separating the pentafluoride from the trifluoride. In a large scale plant the trifluoride is returned to the reaction chamber.

The jacket 24 for the illustrated pilot plant is provided with a conventional refrigerative system permitting use of various temperatures. A tank 37 containing a suitable heat-transfer fluid, e.g., trichloroethylene, is connected by flow lines 38 and 39 to the jacket 24, and a pump 40 recirculates the heat-transfer fluid through the jacket 24 and the tank 37. For cooling the heat-transfer fluid, there is a cylinder 42 of liquid nitrogen connected by flow line 43 to a coiled tube 44 in the tank 37, the coiled tube 44 being vented at its downstream end 45. A thermostatic valve 46 controls the amount of nitrogen which is passed through the coiled tube 44. For operating pressures in the reaction and condensing chambers of the order of about 4,000 psi, the condensing chamber may be designed for mere atmospheric cooling.

For supplying pressurized fluorine gas to the reaction chamber, the illustrated pilot plant includes a simple system having no pumps nor compressors. From a commercial cylinder of fluorine gas at 49 the gas passes by a line 50, equipped with a valve 51, to a condenser 53 which includes a Dewar flask 54 adapted to contain liquid nitroge. When practically all of the fluorine gas from the cylinder 49 is condensed into the condenser 53, the valve 51 is closed. The liquid nitrogen is then removed from the Dewar flask 54 allowing the condensed fluorine in the condenser 53 to warm to atmospheric temperature for transfer to a surge tank 56 via flow line 57 which is controlled by a valve 58. By continually transferring fluorine from the condenser 53 to the surge tank, the pressure in the surge tank is maintained greater than that at which it has been elected to conduct the chemical reactions in the reaction chamber 10. From the surge tank 56 the pressurized fluorine gas passes through line 60, containing a constant pressure-regulating valve 61, to a flow line 63 which is connected at its downstream end to the inlet 16 of the reaction chamber 10.

For supplying the chlorine constituent for the chlorine pentafluoride to be produced, the illustrated pilot plant uses chlorine from a commercial cylinder 66. A positive displacement pump 67 in a flow line 68 delivers liquid chlorine at a predetermined flow rate from the cylinder 66 to a tube 70 having a restrictor 71 between its ends. A heater 72 at the upstream side of the restrictor serves to vaporize the chlorine in the tube 70. Just downstream of the restrictor, the tube 70 has an inlet 74 to which a flow line 75 is connected for admitting uncondensed gas (primarily fluorine) from the exhaust tube 28 in the condensing chamber 12. A throttle valve 76 in a flow line 75 controls the rate of fluorine gas which is continuously recycled from the condensing chamber to the reaction chamber. The fluorine being recycled reacts with the chlorine gas in the tube 70 forming chlorine monofluoride and chlorine trifluoride. Inasmuch as the fluorinations which occur in the tube 70 are exothermic, there is a water jacket 78 around the downstream end portion of the tube 70 to permit control of the temperature of the contents of the tube which pass via line 79 to the inlet line 63 for the reaction chamber. The use of reaction tube 70 and the pre-reaction of chlorine and fluorine to form chlorine monofluorine and chlorine trifluoride in reaction tube 70 is the discovery of Frederick D. Raniere and Curtis A. Younts and is disclosed and claimed in copending application Ser. No. 575,101, filed Aug. 25, 1966.

The following table sets forth particulars of operating conditions for examples of the practice of this invention using a pilot plant as illustrated and in which the cylinders 14 and 23 are of 3 inches and 2 inches, respectively, schedule 40 pipe, 5 ft. 3 inches long, and the interconnecting tube is one-half inch OD × 0.065 inch wall thickness:

| Example No. | 1 | 2 | 3 |
|---|---|---|---|
| Pressure in reaction chamber in psig. | 1020 | 1270 | 1490 |
| Temp. in reaction chamber in °F. | 495 | 485 | 400 |
| Temp. in condensing chamber in °F. | −100 | −100 | −100 |
| Liquid chlorine supplied by pump 67, c.c./hr. | 30 | 36 | 100 |
| Rate of flow of recycled uncondensed gas through flow line 74, in ml./min and calculated at 1500 psi, 212°F. | — | — | 50 |
| Time of run in consecutive hours | 53 | 94 | 87 |
| Yield of $ClF_5$ in mol percent | 25 | 41 | 46 |

For the operating conditions of Example No. 3 in the above table, it has been calculated that the mol ratio of fluorine to chlorine is about 9:1, wherefore the amount of fluorine used (calculated on a basis of 100 percent fluorination to $ClF_5$) is slightly less than twice that needed. The process of this invention is operable under conditions where the ratio of fluorine atoms to chlorine atoms fed into the reaction chamber is in the range of from about 6:1 to about 20:1. Such range includes at one end a ratio providing but slight excess of fluorine for full fluorination of the chlorine, and at the other end of the range a ratio providing substantial excess fluorine beyond which it would not be economical to practice the invention.

Operable conditions for the process of this invention further include maintaining a differential between the temperature in the reaction chamber and the temperature in the copending chamber in the range of from about 200°F to about 600°F.

It will be understood that it is intended to cover all changes and modifications of the examples of the invention herein shown for the purpose of this disclosure, which do not constitute departures from the spirit and scope of the invention.

Having described the invention, what is claimed is:

1. Apparatus for producing chlorine pentafluoride comprising a reaction chamber; conduit means for passing fluorine as one gaseous reactant and at least one member of the group consisting of chlorine, chlorine monofluoride and chlorine trifluoride as another gaseous reactant into the chamber adjacent the lower end of the chamber; means for maintaining the contents of the reaction chamber at a temperature sufficiently high to effect reaction between said reactants to form gaseous chlorine pentafluoride in a mixture with gaseous fluorine; a condensing chamber; conduit means for passing said mixture from the reaction chamber at a place adjacent the upper end of the reaction chamber to the condensing chamber at a place adjacent the upper end of the condensing chamber; means for maintaining the temperature in said condensing chamber sufficiently low to effect condensation of chlorine pentafluoride from said mixture; means for withdrawing condensed chlorine pentafluoride from said condensing chamber, and means for recirculating the uncondensed gas from the condensing chamber at a place remote from the upper end of the condensing chamber to the reaction chamber at a place adjacent the lower end of the reaction chamber, said means for recirculating comprising means to provide a temperature and density differential of gases in the respective chambers sufficient to be a driving force to recirculate the uncondensed gas.

2. The invention as set forth in claim 1 in which said last mentioned means provides for a thermal gradient between said chambers of from about 200° to 600°F.

3. The invention as set forth in claim 1 in which said means for maintaining the temperature of said reaction chamber comprises jacket means surrounding said reaction chamber, heat transfer means within said jacket and means to maintain a predetermined temperature of said heat transfer means in relation to the reaction chamber temperature.

4. The invention as set forth in claim 1 in which said means for maintaining the temperature of said condensing chamber comprises jacket means surrounding the condensing chamber, a heat transfer fluid within said jacket means and means for cooling said fluid.

5. The invention as set forth in claim 1 wherein said meanas for recirculating the uncondensed gas includes an outlet tube upstanding from the bottom of the condensing chamber.

6. Apparatus for producing a compound from two reactants comprising a reaction chamber, conduit means for passing a first gaseous reactant and a second reactant to said chamber, means for maintaining the content of the reaction chamber at a temperature sufficiently high to effect reaction between said reactants to form said compound in gaseous form in a mixture with said first gaseous reactant, a condensing chamber, conduit means for passing said gaseous mixture from the reaction chamber at a place adjacent the upper end of the reaction chamber to the condensing chamber at a place adjacent the upper end of the reaction chamber to the condensing chamber at a place adjacent the upper end of the condensing chamber, means for maintaining the temperature in said condensing chamber sufficiently low to effect condensation of said compound from said mixture, means for withdrawing condensed compound from said condensing chamber, and means for recirculating the uncondensed gas from the condensing chamber at a place remote from the upper end of the condensing chamber to the reaction chamber at a place adjacent the lower end of the reaction chamber, said means for recirculating comprising means to provide a temperature and density differential of gases in the respective chambers sufficient to be a driving force to recirculate the uncondensed gas.

7. The invention as set forth in claim 6 in which each of said reaction and condensing chambers are tall cylinders encircled by a confining jacket and wherein the means for maintaining temperature in each of said chambers comprises a heat transfer fluid situated in the volumes between said jacekts and said cylinders.

8. The invention as set forth in claim 7 including means to pressurize the volume between the jacket and the reaction cylinder with an inert gas to develop a pressure therein at which the boiling point of the heat transfer fluid will be about equal to the temperature at which it is desired that the reaction chamber be maintained.

* * * * *